United States Patent [19]
Sato et al.

[11] Patent Number: 6,007,165
[45] Date of Patent: Dec. 28, 1999

[54] ACCELERATION SLIP CONTROL SYSTEM FOR MOTOR VEHICLE

[75] Inventors: Hiromichi Sato, Atsugi; Tetsuya Tokuda, Anjo, both of Japan

[73] Assignees: Toyota Jidosha Kabushiki Kaisha, Tokyo; Denso Corporation, Kariya, both of Japan

[21] Appl. No.: 08/898,276

[22] Filed: Jul. 22, 1997

[30] Foreign Application Priority Data

Jul. 29, 1996 [JP] Japan .................................... 8-199007

[51] Int. Cl.⁶ ......................................................... B60T 8/58
[52] U.S. Cl. ...................... 303/191; 303/113.2; 303/113.5
[58] Field of Search ............................. 303/113.2, 116.1, 303/139, 166, 191

[56] References Cited

U.S. PATENT DOCUMENTS

| | | | |
|---|---|---|---|
| 5,205,623 | 4/1993 | Holzmann et al. | 303/113.2 |
| 5,310,253 | 5/1994 | Beck | 303/113.1 |
| 5,531,514 | 7/1996 | Nishii et al. | 303/116.1 |
| 5,549,366 | 8/1996 | Toda et al. | 303/113.2 |
| 5,584,543 | 12/1996 | Sawada | 303/191 |
| 5,620,238 | 4/1997 | Takeuchi | 303/113.2 |
| 5,636,907 | 6/1997 | Okazaki et al. | 303/10 |
| 5,727,852 | 3/1998 | Pueschel et al. | 303/113.4 |
| 5,826,950 | 10/1998 | Jonnev et al. | 303/113.2 |

FOREIGN PATENT DOCUMENTS

| | | |
|---|---|---|
| A 4-262951 | 9/1992 | Japan . |
| A 8-91196 | 4/1996 | Japan . |

*Primary Examiner*—Chris Schwartz
*Attorney, Agent, or Firm*—Oliff & Berridge, PLC

[57] ABSTRACT

In an acceleration slip control system for a motor vehicle, (a) a device for detecting the temperature of brake fluid at the end of an acceleration slip control or, (b) a device for detecting the hydraulic pressure of the wheel cylinder at the end of the acceleration slip control, is installed in order that a predetermined time period for which a releasing device for reducing the hydraulic pressure of a wheel cylinder is released to open a fluid passage leading to a reservoir, may be made variable in accordance with the detected brake fluid temperature or the hydraulic pressure. Alternatively, (c) a device for detecting the hydraulic pressure of the wheel cylinder in real time is installed in order that the releasing means for reducing the hydraulic pressure of the wheel cylinder may be released until the hydraulic pressure of the wheel cylinder becomes lower than a predetermined value. Thus, when the acceleration slip control has ended, the control system can cope with subsequent braking more quickly while protecting a master cylinder and preventing the production of noise.

6 Claims, 6 Drawing Sheets

FIG.5

| HYDRAULIC PRESSURE (MPa) <br> TEMPERATURE (°C) | 0~a | a~b | b~ |
|---|---|---|---|
| T0~ | t1 | t2 | t3 |
| T1~T0 | t4 | t5 | t6 |
| ~T1 | t7 | t8 | t9 |

ACCELERATION SLIP CONTROL SYSTEM FOR MOTOR VEHICLE

BACKGROUND OF THE INVENTION

1. Field of the Invention

The present invention relates to an acceleration slip control system for a motor vehicle, and more particularly to one of the type in which the hydraulic pressure of each wheel cylinder is reduced after the end of an acceleration slip control.

2. Description of the Prior Art

In general, in the mode of an acceleration slip control for a motor vehicle, the communication between a master cylinder (which is communicated with a brake pedal) and each wheel cylinder is cut off, and a hydraulic pressure source for the acceleration slip control and the wheel cylinder are brought into communication, whereupon the hydraulic pressure of the wheel cylinder is controlled. After the end of the acceleration slip control, the master cylinder and the wheel cylinder are brought into communication again. However, when a high residual pressure exists in the wheel cylinder or a pipe on this occasion, it flows into the master cylinder. It is therefore apprehended that noise will be produced or that the cup of the piston of the master cylinder will be damaged.

In this regard, with the intention of protecting the master cylinder, a control system is disclosed in, for example, the official gazette of Japanese Patent Application Laid-open No. 91196/1996. Herein, after the end of the acceleration slip control, the hydraulic pressure of the wheel cylinder is sufficiently reduced, thereafter, the master cylinder and the wheel cylinder are communicated.

According to the known control system, in the mode of the acceleration slip control, a fluid passage which joins the master cylinder with the wheel cylinder is blockaded by a master cut valve. Under this condition, the discharge side of a pump is connected between the master cut valve and the wheel cylinder so as to transmit the discharge pressure thereof to the wheel cylinder.

At the end of the acceleration slip control, a fluid passage part which joins the wheel cylinder with the reservoir of the master cylinder (master reservoir) is opened by a releasing device for a predetermined time period, thereby to sufficiently reduce the hydraulic pressure of the wheel cylinder. Thereafter, the master cut valve is opened.

With the control system disclosed in the above official gazette, the predetermined time period (release time period of the releasing means) for reducing the hydraulic pressure of the wheel cylinder is set equally or indiscriminately.

However, when the predetermined time period for the pressure reduction is set to be somewhat long, the master cylinder and the wheel cylinder are separated unnecessarily long in some drive environments. In consequence, if the brakes are applied in the course of the pressure reduction, the effective braking of driving wheels will delay in correspondence with the operating procedures in which the hydraulic pressure of the wheel cylinder is sufficiently reduced, and the released or OFF state is changed-over into an applied or ON state so that the master cylinder and the wheel cylinder fall into the communicating state. Regarding the delay, therefore, said predetermined time period should preferably be as short as possible.

However, when the predetermined time period is set to be somewhat short, the master cylinder and the wheel cylinder are brought into communication before the sufficient reduction of the residual pressure, in an exemplary situation where the temperature of brake fluid is low or where a very high hydraulic pressure has been exerted on the wheel cylinder. It is therefore impossible to attain the effects of the control originally intended.

SUMMARY OF THE INVENTION

The present invention has been made in view of the problems of the prior art as stated above, and has for its object to provide an acceleration slip control system for a motor vehicle which can efficiently carry out a pressure reducing operation after an acceleration slip control and can prevent a wasteful control while avoiding the production of noise and protecting a master cylinder.

More specifically, an acceleration slip control system for a motor vehicle has a master cut valve which is disposed in a fluid passage joining a master cylinder with a wheel cylinder, a pump whose discharge side is connected to the fluid passage between the master cut valve and the wheel cylinder, a fluid passage branch which is branched from the part of the fluid passage between the master cut valve and the wheel cylinder and which is connected to reservoir means, and releasing means disposed in the fluid passage branch. Herein, during an acceleration slip control, the master cut valve is closed to cut off the master cylinder and the wheel cylinder from each other, and a hydraulic pressure is transmitted from the pump to the wheel cylinder. Besides, at the end of the acceleration slip control, the releasing means is released (opened) for a predetermined time period so as to reduce the hydraulic pressure of the wheel cylinder, and the master cut valve is thereafter opened. As indicated at items (a) in FIG. 1, the structure comprises temperature detection means for detecting a temperature of brake fluid at the end of the acceleration slip control. Herein, the predetermined time period for which the releasing means is released is made variable in accordance with the detected brake fluid temperature.

Depending upon brake fluid temperatures, the brake fluid exhibits different viscosities and flows within the fluid passage at different speeds, so that the predetermined time period for the pressure reduction is also different. In this regard, according to the structure in FIG. 1, the predetermined time period for the pressure reduction is altered in accordance with the brake fluid temperature, and hence, a more appropriate pressure-reduction control is realized.

Further, as indicated at items (b) in FIG. 1, the structure comprises hydraulic pressure detection means for detecting the hydraulic pressure of the wheel cylinder at the end of the acceleration slip control. Herein, the predetermined time period for which the releasing means is released is made variable in accordance with the detected hydraulic pressure.

The predetermined time period required for the pressure reduction differs depending upon the residual hydraulic pressure of the wheel cylinder immediately after the end of the control, that is, the initial pressure of the pressure reduction stage. In this regard, according to the structure in FIG. 1, the predetermined time period for the pressure reduction is altered in accordance with the residual hydraulic pressure of the wheel cylinder, and hence, a more appropriate pressure-reduction control is realized.

Still further, as indicated at items (c) in FIG. 1, the structure in Claim 3 comprises hydraulic pressure detection means for detecting in real time the hydraulic pressure of the wheel cylinder after the end of the acceleration slip control. Herein, the releasing means is changed-over from the released or OFF state into an applied or ON state when the detected hydraulic pressure has become lower than a predetermined pressure value.

According to the structure in FIG. 1, the hydraulic pressure of the wheel cylinder after the end of the acceleration slip control is detected in real time, and the releasing means is changed-over from the open or OFF state into the closing or ON state in response to the detected hydraulic pressure lower than the predetermined pressure value. Thereafter, the master cylinder and the wheel cylinder are brought into communication. It is therefore permitted to perform the pressure reduction control for only a time period which is really required.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 5 is a map for calculating a predetermined time period for the reduction of a hydraulic pressure in the first aspect of performance of the present invention.

DETAILED DESCRIPTION OF THE PREFERRED EMBODIMENTS

Now, examples of the aspects of performance of the present invention will be described in detail with reference to the drawings.

Figure 1:
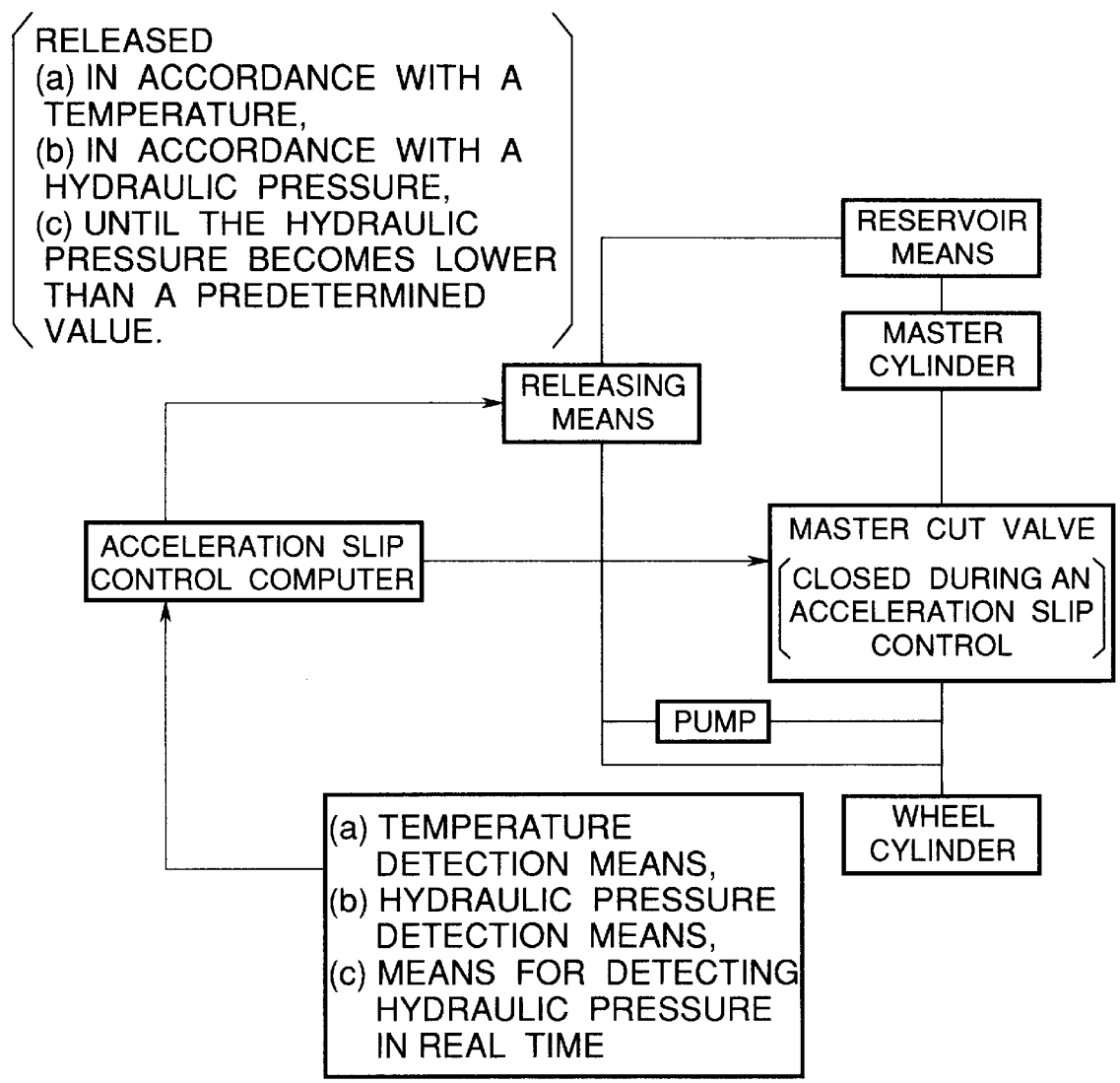
FIG. 1 is a block diagram showing the operation of the present invention.
Figure 2:
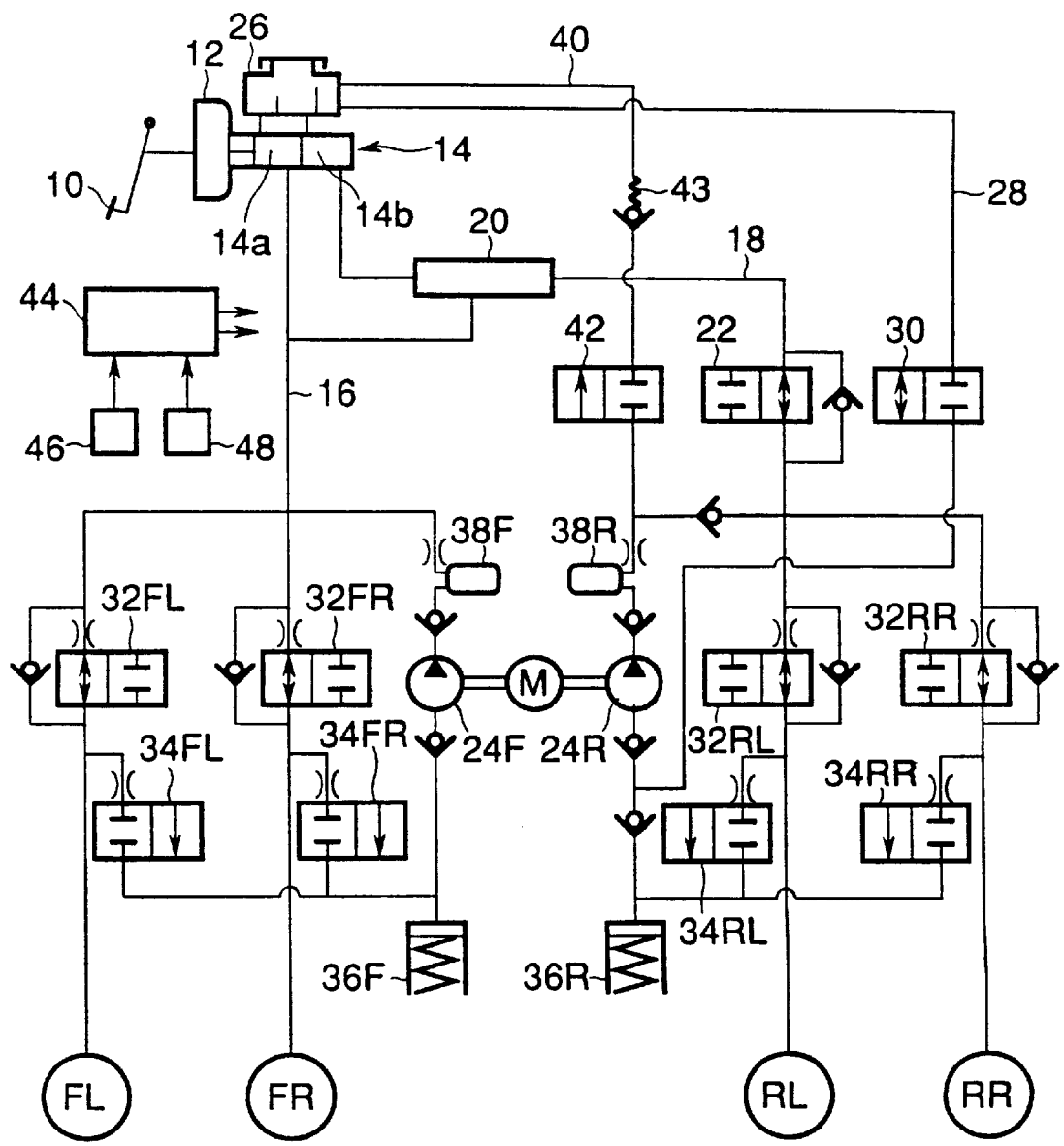
FIG. 2 is a hydraulic circuit diagram showing the outline of an acceleration slip control system for a motor vehicle to which the present invention is applied.

FIG. 2 is a hydraulic circuit diagram showing the outline of an acceleration slip control system for a motor vehicle to which the present invention is applied.

Referring to FIG. 2, a brake pedal 10 is connected to a master cylinder 14 through a booster 12. The master cylinder 14 is separated into two fluid chambers 14a and 14b. When the brake pedal 10 is pressed, hydraulic pressures of equal heights or values are respectively generated in the two fluid chambers 14a and 14b.

The fluid chamber 14a is connected to the side of front wheel cylinders FL and FR by a fluid passage 16, while the fluid chamber 14b is connected to the side of rear wheel cylinders RL and RR through a P&B valve (proportioning & bypass valve) 20 by a fluid passage 18.

A first changeover valve 22 for communicating and cutting off the master cylinder 14 and the rear wheel cylinders RL and RR is disposed in that part of the fluid passage 18 which extends between the P&B valve 20 and the side of rear wheel cylinders RL and RR. The discharge side of a pump 24R is connected to that part of the fluid passage 18 which extends between the first changeover valve 22 and the side of the rear wheel cylinders RL and RR.

Herein, the suction side of the pump 24R and the reservoir (master reservoir) 26 of the master cylinder 14 are connected through a fluid passage 28. A second changeover valve 30 is disposed midway of the fluid passage 28. The second changeover valve 30 is usually closed. In the mode of an acceleration slip control, the valve 30 is opened, and the pump 24R draws brake fluid from the master reservoir 26 and delivers the brake fluid to the wheel cylinders RL and RR through this valve 30.

Holding valves 32RL and 32RR and reducing valves 34RL and 34RR are respectively interposed between the pump 24R and the wheel cylinders RL and RR. A reservoir 36R is connected to the reducing valves 34RL and 34RR. The reservoir 36R stores therein the brake fluid which serves mainly for pressure reduction in the mode of an ABS control (antiskid brake system control).

A dumper 38R is disposed on the discharge side of the pump 24R. The discharge side of the pump 24R and the master reservoir 26 are connected by a fluid passage 40. A relief valve 42 and a pressure regulator valve 43 are disposed midway of the fluid passage 40. The relief valve 42 and the pressure regulator valve 43 serve for causing a high hydraulic pressure to escape into the master reservoir 26 for the purpose of the protection of the control system when the brake fluid pressure in a pipe has become excessively high during the acceleration slip control.

At the end of the acceleration slip control, the drive of the pump 24R is stopped, and the hydraulic pressure of the fluid passage part between the first changeover valve 22 and the wheel cylinder RL (or RR) is caused to escape into the master reservoir 26 and the reservoir 36R through the holding valve 32RL (or 32RR), reducing valve 34RL (or 34RR) and second changeover valve 30. Thus, the hydraulic pressures are reduced in the fluid passage parts between the first changeover valve 22 and the wheel cylinders RL and RR.

As understood from the above, in this aspect of performance, the master reservoir 26 and the reservoir 36R correspond to "reservoir means" in the present invention. The holding valve 32RL (or 32RR), the reducing valve 34RL (or 34RR) and the second changeover valve 30 correspond to "releasing means" in the present invention. Further, the first changeover valve 22 corresponds to a "master cut valve" in the present invention.

The holding valve 32RL (or 32RR), reducing valve 34RL (or 34RR) and second changeover valve 30 are brought into "open" ("released" or "OFF") states for a predetermined time period as the "releasing means" according to the present invention on the occasion of the end of the acceleration slip control, thereby to reduce the hydraulic pressure of the wheel cylinder RL (or RR). After the end of the pressure reduction stage, however, all of these valves need not always be "closed" ("applied" or "turned ON") at the same time. More concretely, in a case where only the reducing valves 34RL and 34RR are "closed" with the first changeover valve 22 "opened", for example, the hydraulic pressure of the master cylinder 14 can be transmitted to the wheel cylinders RL and RR.

The front side is constructed similarly to the rear side. More specifically, a pump 24F is connected to the fluid passage 16. The pump 24F is driven by the same motor M as that of the pump 24R. A dumper 38F is disposed on the discharge side of the pump 24F. Holding valves 32FL and 32FR and reducing valves 34FL and 34FR are respectively interposed between the pump 24F and the wheel cylinders FL and FR. A reservoir 36F is connected to the reducing valves 34FL and 34FR.

A computer (TRCECU short for traction-control electronic control unit) 44 for performing the acceleration slip control is supplied with signals from temperature detection device 46 for detecting the temperature of the brake fluid and from hydraulic pressure detection device 48 for detecting the hydraulic pressures of the wheel cylinders. The TRCECU 44 is further supplied with the signals of wheel speeds, a throttle valve opening degree, etc.

During the acceleration slip control, the first changeover valve 22 is closed to cut off the communications between the master cylinder 14 and the wheel cylinders RL and RR. Further, the second changeover valve 30 is opened, and the pump 24R is driven. The pump 24R draws up the brake fluid from the master reservoir 26 through the second changeover valve 30, and delivers the brake fluid to the wheel cylinders RL and RR through the respective holding valves 32RL and 32RR.

In such a case where (i) the acceleration slip of the motor vehicle has been suppressed by exerting the hydraulic pressure on the wheel cylinder RL or RR, where (ii) the brake pedal 10 has been pressed in the course of the acceleration slip control, or where (iii) the ABS control has been started in the course of the acceleration slip control, the acceleration slip control is ended, and a control end flag is turned ON. The present invention relates to a control which is executed after the end of the acceleration slip control.

The operation of the first aspect of performance will now be described with reference to a flow chart illustrated in FIG. 3.

Figure 3:
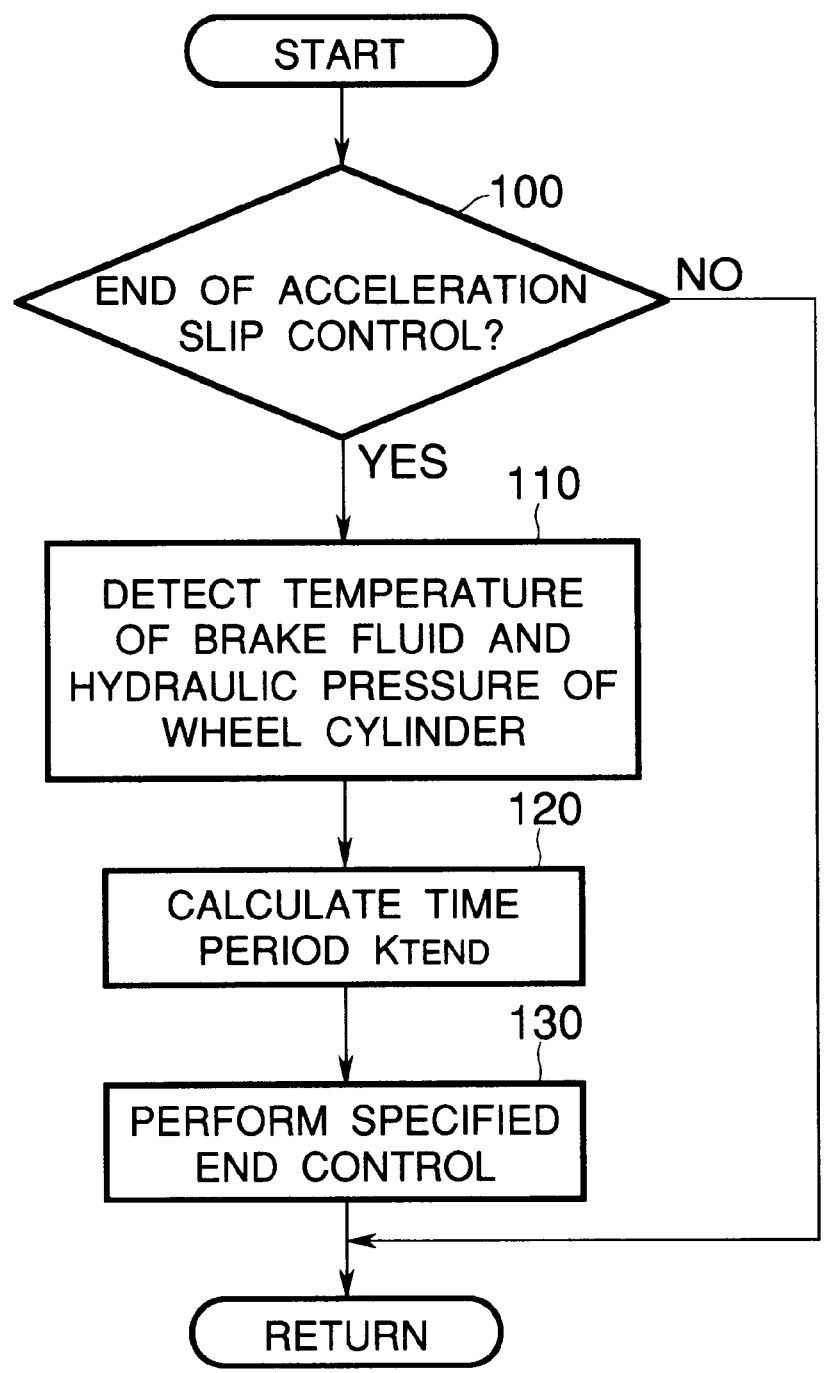
FIG. 3 is a flow chart showing the operation of the first aspect of performance of the present invention.
Figure 4:
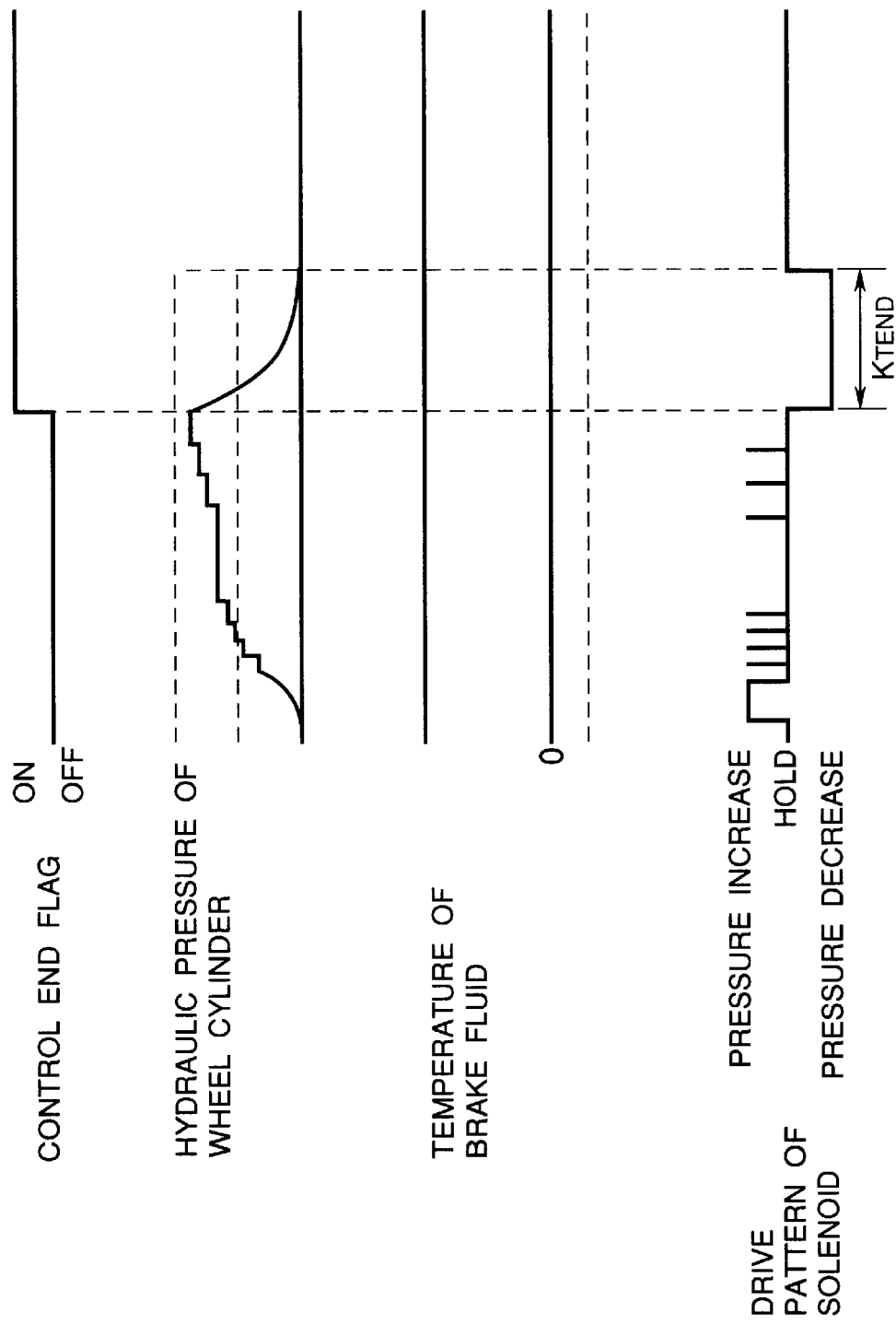
FIG. 4 is a time chart showing a control based on the first aspect of performance of the present invention.

A step 100 in FIG. 3 serves to decide whether or not the acceleration slip control has been ended. As shown by a time chart in FIG. 4, the decision is rendered in accordance with whether or not the control end flag is ON. In a case where the acceleration slip control has not been ended yet, the flow of the control is immediately returned. On the other hand, in a case where the acceleration slip control has been ended, the control flow proceeds to a step 110, at which the temperature of the brake fluid and the hydraulic pressure of the wheel cylinder at the current time are detected.

There are various methods for the detection of the brake fluid temperature. By way of example, information on the temperature of an engine coolant may well be obtained so as to estimate the brake fluid temperature on the basis of the information. Alternatively, the brake fluid temperature can be estimated on the basis of a time period which has lapsed since the turn-ON of the ignition switch of the motor vehicle and/or a time period for which the brakes have been applied, by obtaining information on the temperature of engine suction air or that of the open air. Of course, the temperature of a brake actuator or the brake fluid may well be directly measured by a thermocouple or the like.

Also, there are various methods for the detection of the wheel-cylinder hydraulic pressure. By way of example, the wheel-cylinder hydraulic pressure may well be estimated on the basis of the cumulative sum of the pressure increase time intervals and pressure decrease time intervals thereof. Alternatively, the wheel-cylinder hydraulic pressure estimated here may well be further multiplied by a temperature-dependent correction coefficient with the information of the brake fluid temperature obtained in the foregoing temperature estimation, thereby to estimate the value of the hydraulic pressure more precisely. It is a matter of course that the wheel-cylinder hydraulic pressure can be directly detected using a pressure sensor or the like.

Subsequently, the predetermined time period for reducing the hydraulic pressure of the wheel cylinder is calculated at a step 120. In this aspect of performance, the second changeover valve 30, holding valve 32RR (or 32RL) and reducing valve 34RR (or 34RL) are opened, and the drive of the pump 24R is stopped. Thus, the residual pressure of the wheel cylinder RR (or RL) is returned into the master reservoir 26 via the holding valve 32RR (or 32RL), reducing valve 34RR (or 34RL) and second changeover valve 30, or it flows into the reservoir 36R, thereby to be reduced. The time period $K_{tend}$ for which these valves are kept open is evaluated from a map shown in FIG. 5, on the basis of the brake fluid temperature and wheel-cylinder hydraulic pressure having been detected directly or indirectly by the exemplary methods at the step 110.

Apart from the map, the predetermined time period $K_{tend}$ can be evaluated using a formula (1) given below:

$$K_{tend} = P \times K1 + T^2 \times K2 \tag{1}$$

Here, letter P denotes the hydraulic pressure of the wheel cylinder, letter T denotes the temperature of the brake actuator or brake fluid (T=0 is held for T>0), and symbols K1 and K2 denote predetermined constants.

Subsequently, the specified end control for reducing the residual pressure is carried out at a step 130. As shown by the time chart in FIG. 4, the specified end control is so performed that the drive pattern of a solenoid for controlling the open and closed states of the valves is set at a pressure decrease mode for the time period $K_{tend}$ since the turn-ON of the control end flag. Thus, the residual pressure is sufficiently reduced within the time period $K_{tend}$ as seen from the graph of the wheel-cylinder hydraulic pressure in FIG. 4.

Although the specified end control is carried out by the use of both the brake fluid temperature and the wheel-cylinder hydraulic pressure in this aspect of performance, it may well be done using only either the brake fluid temperature or the wheel-cylinder hydraulic pressure.

Next, the operation of the second aspect of performance of the present invention will be described with reference to a flow chart illustrated in FIG. 6.

The first aspect of performance consists in that the predetermined time period for the pressure reduction is determined in accordance with the brake fluid temperature and wheel-cylinder hydraulic pressure at the end of the acceleration slip control, thereby to attain the pressure reduction control which is more appropriate. On the other hand, the second aspect of performance consists in that the wheel-cylinder hydraulic pressure is detected in real time, and that, when the wheel-cylinder hydraulic pressure has been reduced below a predetermined value which is previously set (near zero), the reducing valve 34RR (or 34RL) is closed, the first changeover valve 22 being opened. That is, the predetermined time period for the pressure reduction is not previously set as being variable, but it becomes variable as the result of the control.

Figure 6:
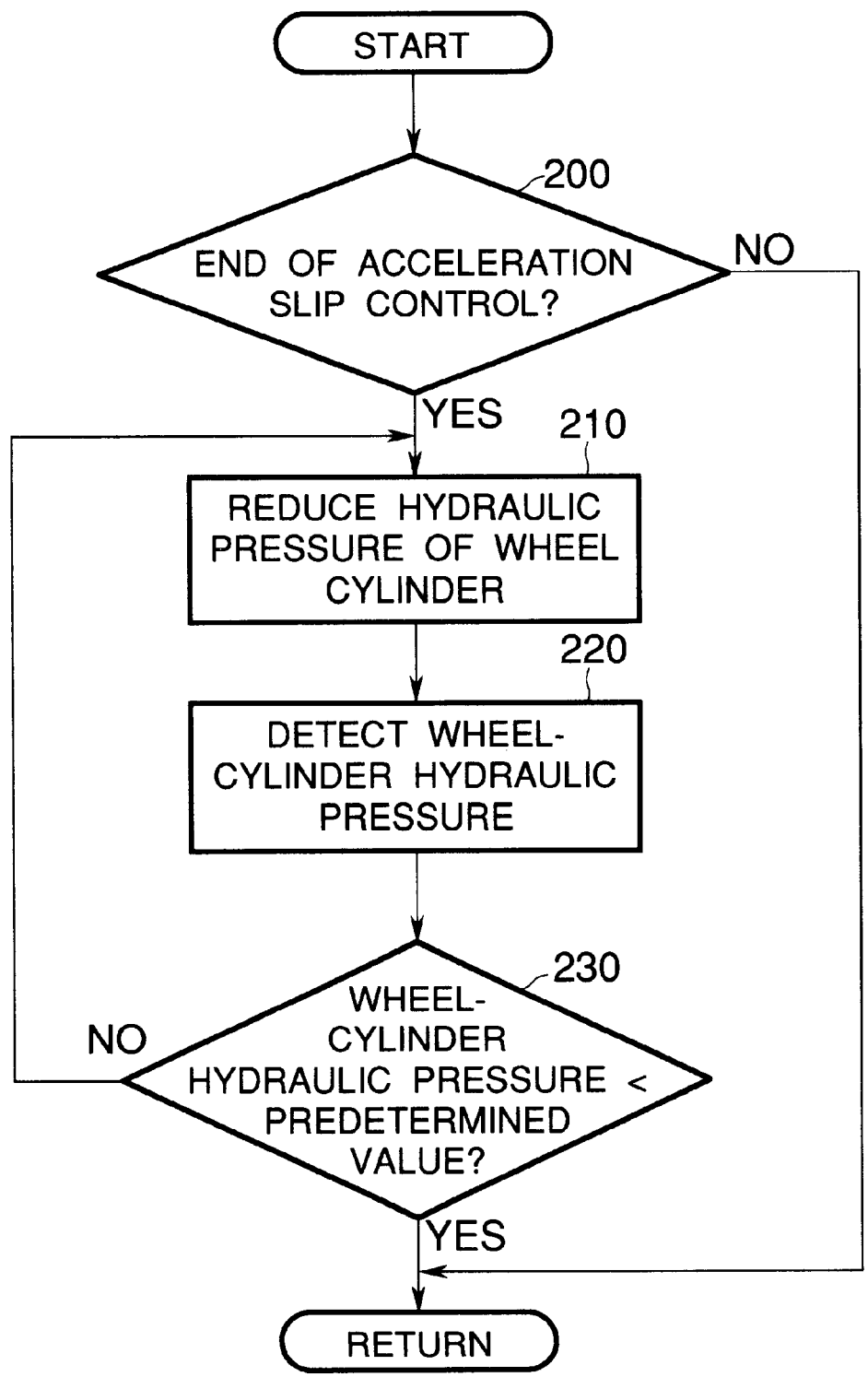
FIG. 6 is a flow chart showing a control based on the second aspect of performance of the present invention.

A step 200 in FIG. 6 serves to decide whether or not the acceleration slip control has been ended. The decision is similar to that of the step 100 in FIG. 3 in the first aspect of performance. In a case where the acceleration slip control has not been ended yet, the flow of the control is immediately returned. On the other hand, in a case where the acceleration slip control has been ended, the control flow proceeds to a step 210, at which the drive of the pump 24R is stopped, and the residual pressure to be reduced is introduced into the master reservoir 26 and reservoir 36R by the holding valve 32RR (or 32RL), reducing valve 34RR (or 34RL) and second changeover valve 30. At the next step 220, the hydraulic pressure of the wheel cylinder is detected in the same way as in the first aspect of performance. Besides, the next step 230 serves to decide whether or not the wheel-cylinder hydraulic pressure has become lower than the predetermined value. In a case where the wheel-cylinder hydraulic pressure has not become lower than the predetermined value yet, the step 230 is followed by the step 210 so as to further continue the pressure reduction. In contrast, in a case where the wheel-cylinder hydraulic pressure has become lower than the predetermined value, the specified end control for reducing the residual pressure is ended. Thus, the pressure reduction at the pressure reduction stage can be executed reliably (neither more nor less).

As described above, according to the present invention, the protection of a master cylinder and the prevention of the production of noise can be achieved at the end of an acceleration slip control, and the communication between the master cylinder and a wheel cylinder can be resumed as early as possible, so that braking subsequent to the acceleration slip control can be coped with more quickly to the corresponding extent.

What is claimed is:

1. An acceleration slip control system for a motor vehicle, comprising: a master cut valve which is disposed in a fluid passage joining a master cylinder with a wheel cylinder, a pump whose discharge side is connected to a part of the fluid passage between said master cut valve and the wheel cylinder, a fluid passage which is branched from the fluid passage part between said master cut valve and said wheel cylinder and which is connected to reservoir means, and releasing means disposed in said fluid passage branch, wherein, during an acceleration slip control, said master cut valve is closed to cut off the master cylinder and said wheel cylinder from each other, and a hydraulic pressure is transmitted from said pump to said wheel cylinder, and at an end of the acceleration slip control, said releasing means is released for a predetermined time period so as to reduce the hydraulic pressure of said wheel cylinder, and said master cut valve is thereafter opened;

said acceleration slip control system further comprising:
temperature detection means for detecting a temperature of brake fluid at the end of said acceleration slip control; wherein:
said predetermined time period for which said releasing means is released is made variable in accordance with the detected brake fluid temperature.

2. An acceleration slip control system for a motor vehicle, comprising: a master cut valve which is disposed in a fluid passage joining a master cylinder with a wheel cylinder, a pump whose discharge side is connected to a part of the fluid passage between said master cut valve and the wheel cylinder, a fluid passage which is branched from the fluid passage part between said master cut valve and said wheel cylinder and which is connected to reservoir means, and releasing means disposed in said fluid passage branch, wherein, during an acceleration slip control, said master cut valve is closed to cut off the master cylinder and said wheel cylinder from each other, and a hydraulic pressure is transmitted from said pump to said wheel cylinder, and at an end of the acceleration slip control, said releasing means is released for a predetermined time period so as to reduce the hydraulic pressure of said wheel cylinder, and said master cut valve is thereafter opened;

said acceleration slip control system further comprising:
hydraulic pressure detection means for detecting said hydraulic pressure of said wheel cylinder at the end of said acceleration slip control; wherein:
said predetermined time period for which said releasing means is released is made variable in accordance with the detected hydraulic pressure.

3. An acceleration slip control system for a motor vehicle, comprising: a master cut valve which is disposed in a fluid passage joining a master cylinder with a wheel cylinder, a pump whose discharge side is connected to a part of the fluid passage between said master cut valve and the wheel cylinder, a fluid passage which is branched from the fluid passage part between said master cut valve and said wheel cylinder and which is connected to reservoir means, and releasing means disposed in said fluid passage branch, wherein, during an acceleration slip control, said master cut valve is closed to cut off the master cylinder and said wheel cylinder from each other, and a hydraulic pressure is transmitted from said pump to said wheel cylinder, and at an end of the acceleration slip control, said releasing means is released for a predetermined time period so as to reduce the hydraulic pressure of said wheel cylinder, and said master cut valve is thereafter opened;

said acceleration slip control system further comprising:
hydraulic pressure detection means for detecting in real time said hydraulic pressure of said wheel cylinder after the end of said acceleration slip control; wherein:
said releasing means is held under said released state until the detected hydraulic pressure has become lower than a predetermined pressure value.

4. An acceleration slip control system for a motor vehicle, comprising: a master cut valve which is disposed in a fluid passage joining a master cylinder with a wheel cylinder, a pump whose discharge side is connected to a part of the fluid passage between said master cut valve and the wheel cylinder, a fluid passage which is branched from the fluid passage part between said master cut valve and said wheel cylinder and which is connected to reservoir means, and releasing means disposed in said fluid passage branch, wherein, during an acceleration slip control, said master cut valve is closed to cut off the master cylinder and said wheel cylinder from each other, and a hydraulic pressure is transmitted from said pump to said wheel cylinder, and at an end of the acceleration slip control, said releasing means is released for a predetermined time period so as to reduce the hydraulic pressure of said wheel cylinder, and said master cut valve is thereafter opened;

said acceleration slip control system further comprising:
temperature detection means for detecting a temperature of brake fluid at the end of said acceleration slip control and hydraulic pressure detection means for detecting said hydraulic pressure of said wheel cylinder at the end of said acceleration slip control; wherein:
said predetermined time period for which said releasing means is released is made variable in accordance with the detected brake fluid temperature and the detected hydraulic pressure.

5. The acceleration slip control system according to claim 1, wherein the lower said detected brake fluid temperature is, the longer said predetermined time period is made.

6. The acceleration slip control system according to claim 2, wherein the higher said detected hydraulic pressure is, the longer said predetermined time period is made.

* * * * *